April 26, 1927.  J. H. KINTZELE  1,626,039
MACHINE FOR PLACING WASHERS UPON THE PINS OF RUBBER HEEL MOLDS
Filed July 18, 1925   3 Sheets-Sheet 3
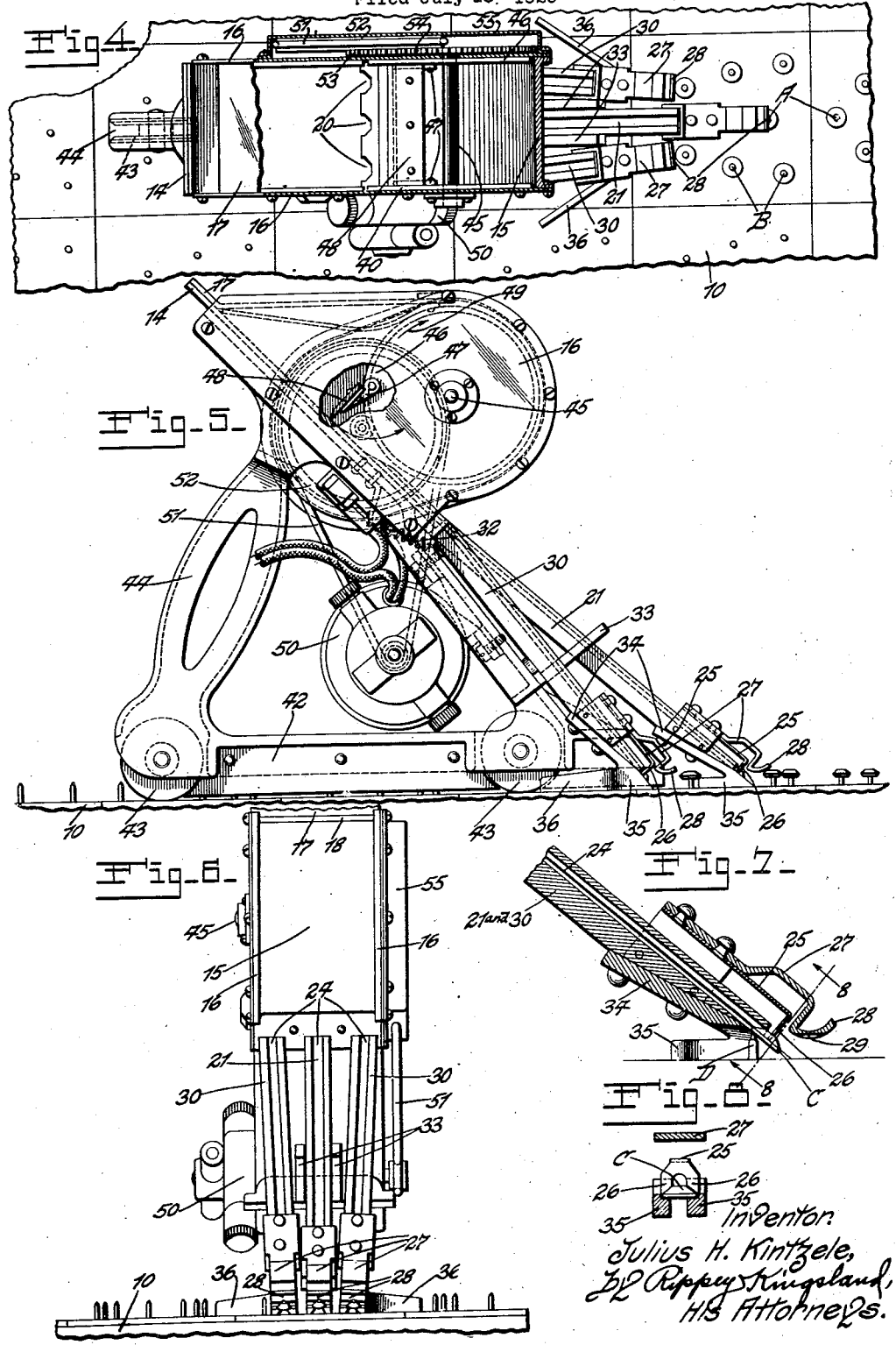

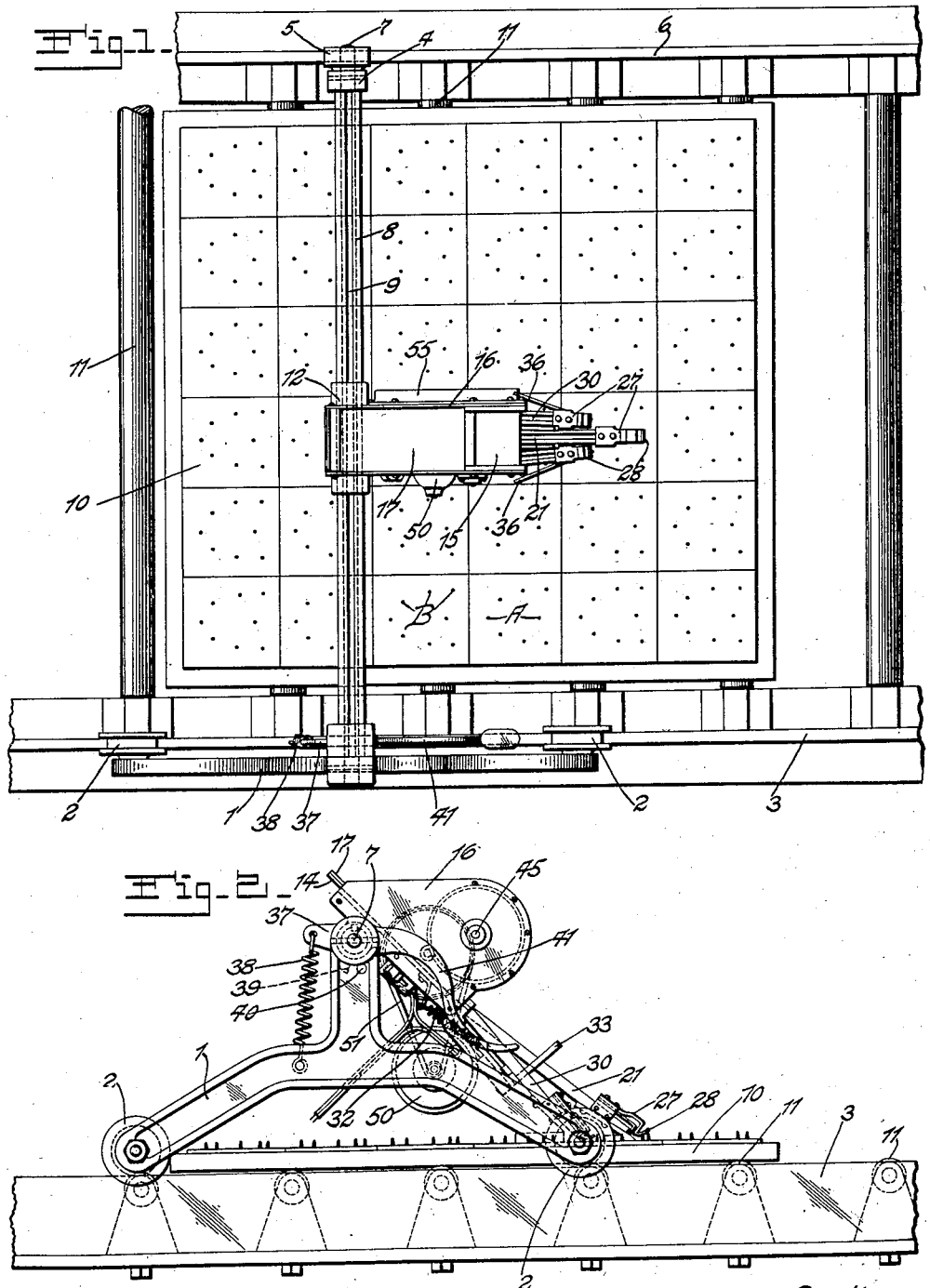

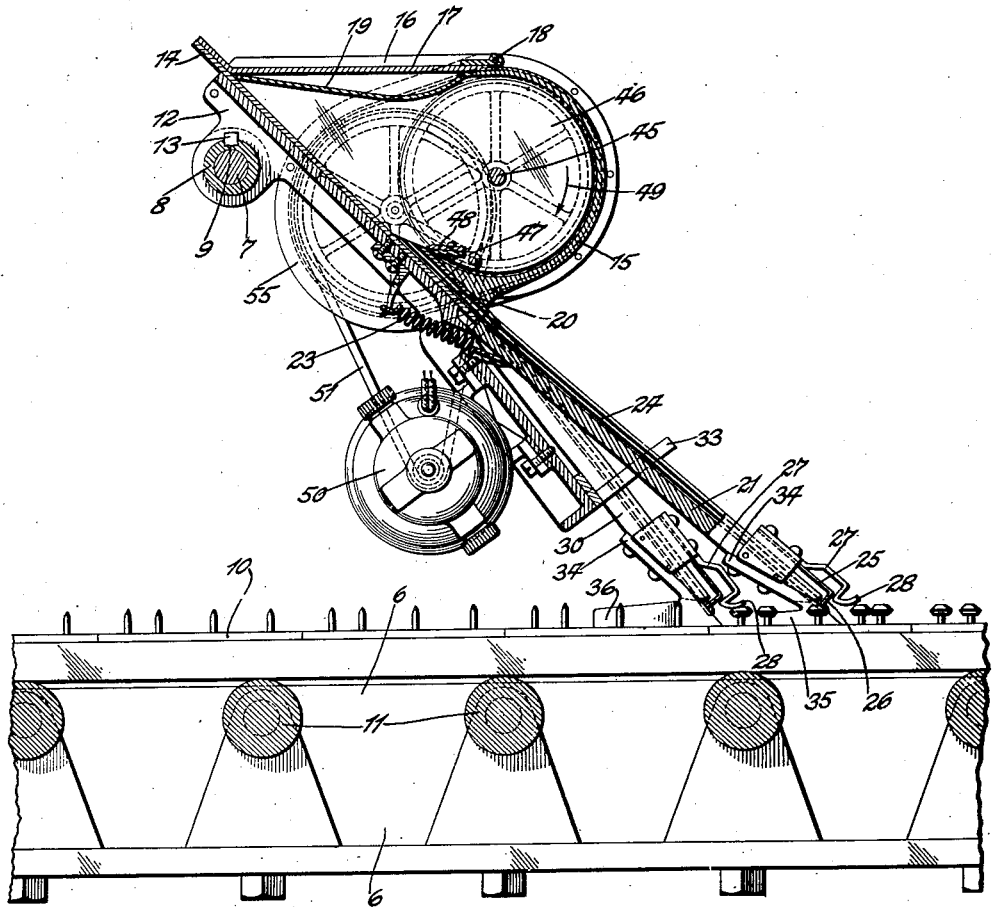

Patented Apr. 26, 1927.

1,626,039

UNITED STATES PATENT OFFICE.

JULIUS H. KINTZELE, OF ST. LOUIS, MISSOURI, ASSIGNOR TO DRYDEN RUBBER COMPANY, OF CHICAGO, ILLINOIS, A CORPORATION OF ILLINOIS.

MACHINE FOR PLACING WASHERS UPON THE PINS OF RUBBER-HEEL MOLDS.

Application filed July 18, 1925. Serial No. 44,436.

This invention relates to machines for placing washers upon the pins of rubber heel molds.

An object of the invention is to provide a machine operable to place washers upon the pins or rubber heel molds and characterized by the useful and improved qualities of ease and rapidity of operation, portability, comparatively small and compact dimensions and few parts, and equipped with mechanism for assuring a continuous delivery of washers to the devices that place the washers upon the pins.

Another object of the invention is to provide a machine for placing washers upon receiving pins comprising a series of fingers having chutes or passages for guiding the washers to the pins and capable of oscillation to place the washers upon pins in zig-zag rows, in combination with a hopper which contains a supply of washers for delivery to the chutes in the fingers, and mechanism operable to stir or agitate the washers in the hopper to require and assure their proper entry into the chutes so that the chutes will remain filled with washers passing to the pins.

Another object of the invention is to provide a machine of the character mentioned having an agitator for the washers in the hopper, and mechanism for operating the agitator.

Various other objects will appear from the following description, reference being made to the accompanying drawings in which—

Fig. 1 is a plan view of one embodiment of the invention showing the machine supported by a carriage for moving the machine to place the washers upon the pins.

Fig. 2 is a side elevation thereof.

Fig. 3 is an enlarged vertical longitudinal section of the machine.

Fig. 4 is a plan view of the machine embodying another form of carriage.

Fig. 5 is a side elevation thereof.

Fig. 6 is a front elevation thereof.

Fig. 7 is a vertical longitudinal sectional view of one of the chute fingers for delivering washers to the pins.

Fig. 8 is a sectional view on the line 8—8 of Fig. 7.

Fig. 9 is a view showing the connection of the chute fingers with the hopper.

In the embodiment of the invention first shown the machine is mounted for lateral adjustments upon a carriage which is operable to move the machine longitudinally above the rows of pins, so that the chute fingers will conduct the washers to positions where the washers will be engaged and retained by the pins as the machine is moved longitudinally. The carriage comprises a side frame 1 supported by peripherally grooved rollers 2 operating upon a rail 3; a side frame part 4 having a roller 5 operating upon a rail 6; a shaft 7 rigidly connecting the side frames 1 and 4, and a sleeve 8 mounted for rocking movements upon the shaft 7 and having a longitudinal groove 9 therein. The rails 3 and 6 may form parts of the support for the pin carrying portions 10 of the molds adapted to be removably supported upon rollers 11 connecting the rails 3 and 6.

The machine comprises a frame 12 mounted on and capable of lateral adjustable movements along the sleeve 8 and held from turning with respect to said sleeve, by a key 13 seating in the groove 9 and engaging the frame 12 (Fig. 3).

The hopper, including a downwardly and forwardly inclined bottom wall 14, an arcuate front wall 15, side walls 16, is supported by the frame 12. A cover 17 has its front edge connected to the hopper by hinges 18 (Fig. 3) and its rear edge supported upon the bottom wall 14 of the hopper, thus preventing the washers from being thrown from the hopper when the machine is in operation. A rebound spring plate 19 is supported by the cover 17 which acts as a resilient cushion to prevent the washers from becoming lodged in the upper corners of the hopper between the cover 17 and the walls of the hopper, and to cause the washers to drop back toward the bottom of the hopper. The cover 17 and the rebound cushion device 19 constitute a door which may be opened to permit the hopper to be filled with washers, or for other purposes.

A number of inclined chutes or passages 20 extending downwardly and forwardly through the hopper wall adjacent to the bottom wall 14 and constitute outlets from the hopper to conduct the washers to the chute fingers that guide the washers to the pins upon which the washers are to be placed. In the present machine there are three chutes 20 which respectively communicate with the three chute fingers that conduct the washers to the pins. It is a familiar fact that according to the present standards of manufacture three rows of washers are imbedded in each rubber heel for certain types of shoes and that the molds for such heels are arranged so that the rows of pins for each heel are in approximate continuation of the rows of pins for other heels, as will be understood by reference to Fig. 1. Thus the pins A of the middle rows of pins of the various heel sections of the mold form nearly a straight row, while the side pins B of the side rows of pins of the various molds form zigzag rows of pins.

The present invention is specially designed to apply to washers of all three rows of pins of the complete row of heel sections of a mold at one operation, though the capacity of the machine may be varied and will include essential subject matter of this invention. Since the rows of pins B are in zigzag relationship it is necessary for the fingers delivering washers to said zigzag rows of pins to oscillate.

The middle finger 21 has its upper end in a seat 22 and is supported by a spring 23 connecting the finger with the frame 12. A chute 24 through a finger 21 is in continuation of a chute 20 from the hopper, so that washers passing through the chute 20 enter the chute 24.

Referring now to Figs. 7 and 8, which illustrate the structure of the discharge ends of the fingers, it will be seen that the lower end of each finger supports a leaf spring 25, the lower ends of which are turned obliquely downwardly and rearwardly to provide spring fingers 26 which are beyond the ends of the chute fingers and against which washers passing from the chute fingers engage and by which such washers are held in sufficient extension beyond the ends of the chute fingers to be engaged by the pins of the molds. Thus the washer C (Fig. 7) is supported by the chute finger and by the fingers 26 so that it will surely be engaged by the pin D of the mold during further movement of the machine. Thus, the washers are placed upon the pins and are properly and securely seated thereon by presser springs 27, the curved ends 28 of which have grooves 29 in their under sides conforming to the concave upper sides of the washers in order to engage and press the washers properly upon the pins.

The side fingers 30 are of the same construction as the middle finger 21 and have their upper ends in seats 31 so that the chutes or passages 24 in the side fingers are held in continuation of the chutes 20 from the hopper. The seats 31 are of slightly greater width than the width of the ends of the fingers 30 so that lateral oscillation of the fingers 30 is permitted in conformity with the variation of the pins B from straight alinement. Springs 32 support the fingers 30 and draw their lower ends toward the middle finger, but permit outward movement of the lower ends of said fingers 30. The frame 12 of the machine supports projections 33 preventing substantial lateral oscillation but permitting vertical oscillation of the middle finger 21, and at the same time limiting inward movement and permitting lateral and vertical oscillation of the side fingers 30.

Each of the fingers 21 and 30 has a part 34 in connection with its lower end each provided at its lower extremity with a pair of spaced and rearwardly diverging arms 35 which function to receive rows of pins between them as the machine moves, and to oscillate the fingers 21 and 30 in conformity with any deviation of the pins from straight rows. The outer arms 35 on the side fingers 30 are provided with longer extensions 36 because the rows of pins B vary more widely from straight rows than do the rows of pins A, and it is necessary for the extensions 36 to extend the full width of the variation of the pins B from straight alinement.

The machine that is supported for movement in laterally adjusted position as above described is operated back and forth by movement of the carriage in which it is adjusted. At each rearward movement of the carriage the machine places washers upon three rows of pins, or upon all the rows of pins, irrespective of the number of rows, in a row of heel molds. After completion of each rearward movement of the machine the fingers are raised to permit return movement of the machine to the opposite end of the mold for another operation, and the machine is also moved laterally in the carriage to place washers upon the pins of another row of heel molds. In the embodiment shown the fingers are raised automatically. The mechanism for raising the fingers automatically includes a lever 37 attached to one end of the sleeve 8 and having its rear end connected with the carriage frame 1 by a spring 38 which acts to turn the sleeve 8 in a direction to raise the lower ends of the washer delivering fingers 21 and 30 to a sufficient height to pass over the upper ends of the mold pins. A shoulder 39 extending from the lever 37 engages an abutment 40 and limits turning movement of the sleeve 8 by the spring 38.

After the machine has been moved to its starting position the sleeve 8 is rocked to depress the free ends of the fingers 21 and 30 so that the washers at the discharge end thereof will be engaged by the pins during rearward movement of the machine. Such rocking of the sleeve 8 may be effected by a hand lever 41 forming a part of the lever 37 or otherwise secured to the sleeve 8.

The machine shown in Figs. 4 to 6 inclusive is the same as that above described, except that the supporting carriage thereof is of different construction. Similar reference characters in all views of the drawings designate similar parts. The carriage for the machine shown in Figs. 4, 5 and 6 is in the form of a truck 42 having peripherally grooved rollers 43 arranged to operate upon the mold and support the machine with the fingers 21 and 30 in position to deliver washers to the pins as the machine is manually moved along the mold. The peripherally grooved rollers 43 receive the pins of the row A in the peripheral grooves thereof and thus guide the machine which may be moved back and forth over the mold by manual engagement of the handle portion 44 forming a part of the supporting frame.

The machine is provided with an agitator or stirrer for causing the washers to enter the chutes 20 from the hopper. A shaft 45 is rotatively supported by the side walls 16 of the hopper and supports a pair of discs 46 within the hopper adjacent to the respective side walls 16 thereof. A bail 47 is pivotally supported by the discs 46 (Figs. 3 and 5) and supports a wiper plate 48. As the discs 46 rotate in the direction of the arrows 49 the edge of the wiper plate 48 operates against the front and bottom walls of the hopper and across the openings to the chutes 20, with the result that the washers are moved and agitated within the hopper and prevented from clogging. By this means the chutes 20 and the chute fingers 21 and 30 are kept filled with washers so that when the machine is operated washers are placed upon all pins of the mold served by the machine.

The machine supports a motor 50 driving a belt 51 engaging a sheave 52 rotatively supported at one side of the hopper and driving a small pinion 53 (Fig. 4). The pinion 53 meshes with a large gear 54 on the shaft 45 and thus operates the wiper for the purposes stated. A housing 55 encloses the gearing 53—54 and the sheave 52.

From the foregoing it will be seen that my invention obtains all of its intended objects and purposes in a highly efficient and satisfactory manner. The machine is capable of variation within equivalent limits without departure from the nature and principle thereof as set forth in the appended claims.

I claim:

1. A machine of the character described comprising a cylindrical hopper, tangential chutes conducting washers from the hopper, chute fingers for conducting washers from said chutes to pins to which the washers are to be applied, rotary supports in the hopper, means for rotating said supports in a direction opposite to the direction of the tangential chutes, and a wiper pivotally supported by said supports at an angle in advance thereof and movable thereby across the openings to said chutes whereby to remove washers jammed at said openings.

2. A machine of the character described comprising a hopper to contain washers, chutes conducting washers from the hopper, chute fingers for conducting washers from said chutes to pins to which the washers are to be applied, rotary supports in the hopper, means for rotating said supports, a wiper pivotally supported by said supports and movable thereby across the openings to said chutes, and a resilient rebound device in the hopper above the openings to said chutes.

3. A machine of the character described comprising a hopper to contain washers, tangential chutes opening from the periphery of the hopper for conducting washers to pins to which the washers are to be applied, a shaft extending across the hopper, means for rotating said shaft in a direction opposite to the direction of the tangential chutes, a wiper within the hopper, and means for pivotally supporting said wiper from said shaft at an angle in advance thereof and pushing said wiper in contact with the perimeter of the hopper and across the openings to said chutes.

4. A machine of the character described comprising a hopper to contain washers, chutes opening from said hopper for conducting the washers to pins to which the washers are to be applied, a shaft extending across the hopper, means for rotating said shaft in a direction opposite to the direction of the chutes, a wiper within the hopper, means for pivotally supporting said wiper from said shaft at an angle in advance thereof and pushing said wiper in contact with a wall of said hopper and across the openings to said chutes, and a carriage supporting said machine.

5. A machine of the character described comprising a hopper to contain washers, chutes opening from the hopper for conducting washers therefrom, a bail pivotally supported within the hopper and arranged to contact with a wall of the hopper in advance of the bail pivot, and means for imparting a continuous rotary movement in one direction to said bail to wipe washers from lodgment across the openings to said chutes.

6. A machine of the character described comprising a hopper containing washers, chutes conducting washers from the hopper, fingers pivotally connected with the hopper and having passages therethrough arranged to receive washers from said chutes respectively, a pair of spring fingers arranged to stop movement of the washers from the ends of said chutes to support the washers extending partly beyond the ends of said fingers and arranged to yield to permit withdrawal of the washers from said fingers, and a stabilizing presser device supported by each chute finger and extending beyond the ends of said spring fingers and having a groove in its under side arranged to receive and contact with the upper portions of the washers after the washers are withdrawn from said chute fingers.

7. A machine of the character described comprising a hopper arranged to contain washers and having outlet chutes inclined to a wall of said hopper for conducting washers therefrom, a wiper in the hopper having an angular leading contact with the wall of said hopper containing the chute openings tending to move the washers away from said chute openings, and mechanism for imparting a continuous rotary motion in one direction to said wiper to shove said wiper in contact with said wall of the hopper across said chute openings.

8. A machine of the character described comprising a hopper arranged to contain washers and having outlet chutes for conducting washers therefrom, a wiper in the hopper arranged to contact with one of the walls of the hopper, mechanism for imparting a continuous rotary movement in one direction to said wiper to move said wiper in contact with said wall of the hopper across the openings to said chutes, and a resilient rebound device in the hopper above the openings to said chutes.

9. A machine of the character described comprising a hopper to contain washers and having chutes for conducting washers therefrom, a shaft extending transversely of the hopper, a pair of discs attached to said shaft within the hopper, a wiper pivoted to said discs and arranged to contact with a wall of the hopper during movement across the openings to said chutes, and mechanism for rotating said shaft and said discs to move said wiper.

10. A machine of the character described comprising a hopper to contain washers and having chutes for conducting washers therefrom, a shaft extending transversely of the hopper, a pair of discs attached to said shaft within the hopper, a wiper pivoted to said discs and arranged to contact with a wall of the hopper during movement across the openings to said chutes, a gear wheel attached to one end of said shaft, a pinion meshing with said gear wheel, and a motor supported by the machine for rotating said pinion.

11. A machine of the character described comprising a finger having a passage therein for guiding washers to one end thereof, mechanism for causing washers to enter one end of said passage, a bifurcated spring at the opposite end of said finger for yieldingly retaining washers in said passage and arranged to yield to permit washers to be withdrawn from said passage when the washers are engaged by the pins to which the washers are to be applied, and a curving stabilizer and presser device supported by said finger and having a groove in its under side arranged to receive and press upon the upper surfaces of the washers after the washers are placed upon the pins.

12. In a machine of the character described comprising a supporting frame, a hopper supported by said frame having chutes for conducting washers therefrom, fingers having passages arranged to receive washers from said chutes, respectively, and to conduct said washers to positions to be engaged by pins, and means supporting said frame and cooperating with certain of the pins to guide the frame.

13. A machine of the character described comprising a frame, a hopper supported by the frame having chutes for conducting washers therefrom, mechanism supported by the frame for wiping washers from lodgment across the ends of said chutes, fingers for conducting washers from said chutes to positions for engagement by pins during movement of the frame, and means in connection with said frame cooperating with certain of the pins to guide the frame during movement thereof.

14. A machine of the character described comprising a hopper having chutes for conducting washers therefrom, fingers for receiving washers from said chutes to positions for engagement by pins during movement of the machine, a tiltable frame supporting said hopper and said fingers, means for tilting the frame to support the fingers above the ends of the pins during movement of the machine to a starting position and for lowering the frame to position in which the washers will be withdrawn from the fingers by the pins during movement of the machine from the starting position, and means cooperating with certain of the pins for guiding the frame.

JULIUS H. KINTZELE.